(12) United States Patent
Joung et al.

(10) Patent No.: US 8,976,718 B2
(45) Date of Patent: Mar. 10, 2015

(54) AUTOMATIC DETECTION APPARATUS FOR UL/DL CONFIGURATION IN LTE-TDD SIGNAL AND THE METHOD THEREBY

(75) Inventors: Jinsoup Joung, Seongnam-si (KR); Seunghwan Ji, Seongnam-si (KR); Yonghoon Lim, Seoul (KR); Jaesung Lee, Incheon (KR)

(73) Assignee: Innowireless Co., Ltd. (KR)

( * ) Notice: Subject to any disclaimer, the term of this patent is extended or adjusted under 35 U.S.C. 154(b) by 81 days.

(21) Appl. No.: 13/822,766

(22) PCT Filed: Jan. 6, 2011

(86) PCT No.: PCT/KR2011/000076
§ 371 (c)(1),
(2), (4) Date: Mar. 13, 2013

(87) PCT Pub. No.: WO2012/043937
PCT Pub. Date: Apr. 5, 2012

(65) Prior Publication Data
US 2013/0176886 A1    Jul. 11, 2013

(30) Foreign Application Priority Data
Sep. 29, 2010  (KR) .................. 10-2010-0094498

(51) Int. Cl.
*H04B 7/00*    (2006.01)
*H04W 24/00*   (2009.01)
(Continued)

(52) U.S. Cl.
CPC ........... *H04W 24/00* (2013.01); *H04B 17/0057* (2013.01); *H04B 17/0077* (2013.01); *H04L 5/0007* (2013.01); *H04L 5/1469* (2013.01)
USPC ........................................... 370/310

(58) Field of Classification Search
USPC .................................. 370/310–350
See application file for complete search history.

(56) References Cited

U.S. PATENT DOCUMENTS

2007/0223876 A1    9/2007  Hashimoto et al.
2009/0312008 A1*  12/2009  Lindoff et al. ................. 455/423

FOREIGN PATENT DOCUMENTS

KR    1020070122241    12/2007
KR    1020090033368     4/2009
(Continued)

OTHER PUBLICATIONS

D. H. Lee, et al., Frequency Synchronization Algorithm for Improving Performance of OFDMA System in 3GPP LTE Downlink, KICS, 2009, pp. 120-130.
(Continued)

*Primary Examiner* — Kwang B Yao
*Assistant Examiner* — Juvena Loo
(74) *Attorney, Agent, or Firm* — Cantor Colburn LLP

(57) ABSTRACT

This invention relates to an automatic detection apparatus for UL/DL configuration in LTE-TDD signal and the method thereby for automatically detecting the UL/DL configuration number of an LTE-TDD signal without a decoder by using a simple structure. An automatic detection apparatus for UL/DL configuration in LTE-TDD signal comprises: a signal receiving unit for receiving an LTE-TDD RF signal and converting the LTE-TDD RF signal into a LTE-TDD baseband signal; a signal extracting unit for extracting a cell-specific reference signal for each subframe length in one frame length of the LTE-TDD baseband signal received from the signal receiving unit; a signal power measurement unit for measuring the power of the corresponding subframe reference signal according to the cell-specific reference signal received from the signal extracting unit; and an UL/DL configuration determination unit for determining whether the corresponding subframe is a DL subframe or an UL subframe according to the comparison result of the power of the corresponding subframe reference signal measured in the signal power measurement unit with a predetermined reference value, and determining the UL/DL configuration number for the corresponding frame based on the subframe number determined as described above. In the above configuration, it is characterized in that the predetermined reference value is the noise power without any LTE-TDD signal.

4 Claims, 3 Drawing Sheets

(51) Int. Cl.
*H04B 17/00* (2006.01)
*H04L 5/00* (2006.01)
*H04L 5/14* (2006.01)

(56) References Cited

FOREIGN PATENT DOCUMENTS

| KR | 1020100006111 | 1/2010 |
| KR | 101011947 | 1/2011 |

OTHER PUBLICATIONS

International Search Report—PCT/KR2011/000076 dated Oct. 24, 2011.
Y. H. You, et al., Low-complexity Coarse Frequency-offset Synchronization for OFDM Applications, IEEE, 2001, pp. 2494-2498.
Korean Notice of Allowance—Korean Application No. 10-2010-0094498 issued on Oct. 17, 2011, citing KR100822558, KR1020090033368, KR102010006111 and KR101011947.

* cited by examiner

Fig. 1
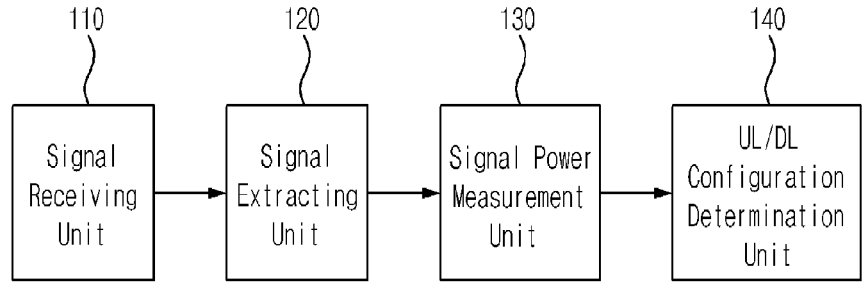
Fig. 2
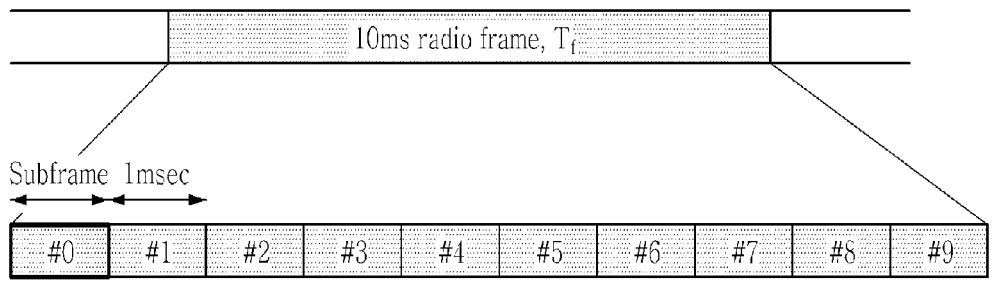
Fig. 3

AUTOMATIC DETECTION APPARATUS FOR UL/DL CONFIGURATION IN LTE-TDD SIGNAL AND THE METHOD THEREBY

TECHNICAL FIELD

This invention relates to an automatic detection apparatus for UL/DL configuration in LTE-TDD signal and the method thereby and, more particularly, to an automatic detection apparatus for UL/DL configuration in LTE-TDD signal and the method thereby for automatically detecting the UL/DL configuration number of an LTE-TDD signal without a decoder by using a simple structure.

BACKGROUND ART

It is well known that the Long Term Evolution (referred to as 'LTE' hereinafter), so named because it evolutionized the 3rd generation (referred to as '3G' hereinafter) mobile communication in long term perspective, is one of the strong candidates for the 4th generation mobile communication technology in parallel with the Wibro Evolution.

This LTE is based on the 'Release 8' that is finalized as a standard specification in December 2008 by the 3rd Generation Partnership Project (referred to as '3GPP' hereinafter) which standardizes 3rd mobile wireless communication; the channel bandwidth is from 1.25 MHz to 20 MHz, and the maximum transmission speed of the downlink is 100 Mbps based on 20 MHz bandwidth, and the maximum transmission speed of the uplink is 50 MHz.

Wireless multiple access and multiplexing method is based on orthogonal frequency-division multiplexing (referred to as 'OFDM' hereinafter), and high speed packet data transmission method is based on multiple-input and multiple-out (MIMO). LTE Advanced is an evolutionized version of the above-described LTE, it will be referred to as '3GPP LTE' hereinafter.

Meanwhile, There are two types of method supporting uplink (referred to as 'UL' hereinafter) and downlink (referred to as 'DL' hereinafter) allocation for an LTE system. The first method is a frequency division duplexing (referred to as 'FDD' hereinafter) which separates UL and DL by frequency band; the second method is time division duplexing (referred to as 'TDD' hereinafter) which separates UL and DL by time domain.

FIG. 1 is a table defining UL and DL transmission periods for the frame structure of an LTE system adopting TDD method (referred to as 'LTE-TDD' hereinafter). UL and DL transmission periods for an LTE-TDD method in the time domain are determined by the UL/DL configuration signal whose number classifies UL and DL into a total of seven types as shown in FIG. 1. In FIG. 1, 'D' stands for a DL sub-frame, 'U' stands for a UL sub-frame, and 'S' stands for a special subframe inserted when switching from a DL subframe to an UL subframe; one frame is comprised of 10 ms and each frame is comprised of 1 ms, hence there is a total of 10 subframes per one frame. For example, for a configuration 1 in FIG. 1, switching from DL to UL is occurring for every 5 ms; hence, there are four DL subframes, four UL subframes, and two special subframes per one frame.

The UL/DL configuration number must be obtained in advance in order to analyze UL/DL signal of an LTE-TDD signal according to the above-described structure. According to the Technical Specification (3GPP TS 36.211 V9.0 (2008-12)), the UL/DL configuration numbers are transmitted via Broadcast Control Channel (referred to as 'BCCH' hereinafter) of the DL, therefore the BCCH must be decoded in order to obtain configuration number at a base station or terminal.

Signal analyzers for analyzing the LTE signals have been developed without BCCH decoder considering complexity thereof; therefore there has been inconveniences that users must imput UL/DL configuration numbers into the signal analyzer in order to analyze LTE-TDD signals.

DISCLOSURE OF INVENTION

Technical Problem

To overcome the problems described above, the objective of this invention is to provide an automatic detection apparatus for UL/DL configuration in LTE-TDD signal and the method thereby for automatically detecting the UL/DL configuration number of an LTE-TDD signal without a decoder by using a simple structure.

Solution to Problem

To achieve the objective described above, an automatic detection apparatus for UL/DL configuration in LTE-TDD signal comprises:

a signal receiving unit for receiving an LTE-TDD RF signal and converting the LTE-TDD RF signal into a LTE-TDD baseband signal;

a signal extracting unit for extracting a cell-specific reference signal for each subframe length in one frame length of the LTE-TDD baseband signal received from the signal receiving unit;

a signal power measurement unit for measuring the power of the corresponding subframe reference signal according to the cell-specific reference signal received from the signal extracting unit; and an UL/DL configuration determination unit for determining whether the corresponding subframe is a DL subframe or an UL subframe according to the comparison result of the power of the corresponding subframe reference signal measured in the signal power measurement unit with a predetermined reference value, and determining the UL/DL configuration number for the corresponding frame based on the subframe number determined as described above.

In the above configuration, it is characterized in that the reference value is the noise power without any LTE-TDD signal.

It is characterized in that the UL/DL configuration determination unit determines the UL/DL configuration number for the corresponding frame by checking only the subframes 3, 4, 7 and 9 among the total 10 subframes wherein the DL and UL subframes are mixed.

Meanwhile, an automatic detection method for UL/DL configuration in LTE-TDD signal according to the other features of the present invention comprises and includes the steps of:

receiving an LTE-TDD RF signal and thereafter converting into an LTE-TDD baseband signal;

extracting a cell-specific reference signal for each subframe length in one frame length of the LTE-TDD baseband signal;

measuring the power of the corresponding subframe reference signal according to the cell-specific reference signal; and determining whether the corresponding subframe is a DL subframe or an UL subframe according to the comparison result of the power of the corresponding subframe reference signal measured in the signal power measurement unit with a predetermined reference value, and determining the UL/DL configuration number for the corresponding frame based on the subframe number determined as described above.

In the above configuration, it is characterized in that the predetermined reference value is the noise power without any LTE-TDD signal.

Meanwhile, determination of the UL/DL configuration can be accomplished by checking only the subframes 3, 4, 7 and 9 among the total of 10 subframes, wherein the UL and DL subframes are mixed.

Advantageous Effects of Invention

According to an automatic detection apparatus for UL/DL configuration in LTE-TDD signal and method thereby of the present invention, it provides users with the analysis results about UL/DL configuration number by automatic detection of the UL/DL configuration number without a decoder having complex structure when analyzing an LTE-TDD signal, and signal analysis relevant to this matter becomes possible.

BRIEF DESCRIPTION OF DRAWINGS

FIG. 1 is a table defining UL and DL transmission periods for the frame structure of an LTE-TDD method;

FIG. 2 is a block diagram of an automatic detection apparatus for UL/DL configuration in LTE-TDD signal of the present invention;

FIG. 3 is an illustration showing a frame structure of an LTE signal;

DESCRIPTION OF REFERENCE NUMERALS OF PRINCIPAL ELEMENTS IN THE DRAWINGS

100: signal receiving unit,
110: signal extracting unit,
120: signal power measurement unit,
130: UL/DL configuration determination unit.

MODE FOR THE INVENTION

Hereinafter an exemplary embodiment according to an automatic detection apparatus for UL/DL configuration in LTE-TDD signal and method thereby of the present invention will be described in detail in with reference to the accompanying drawings.

Figure 4:
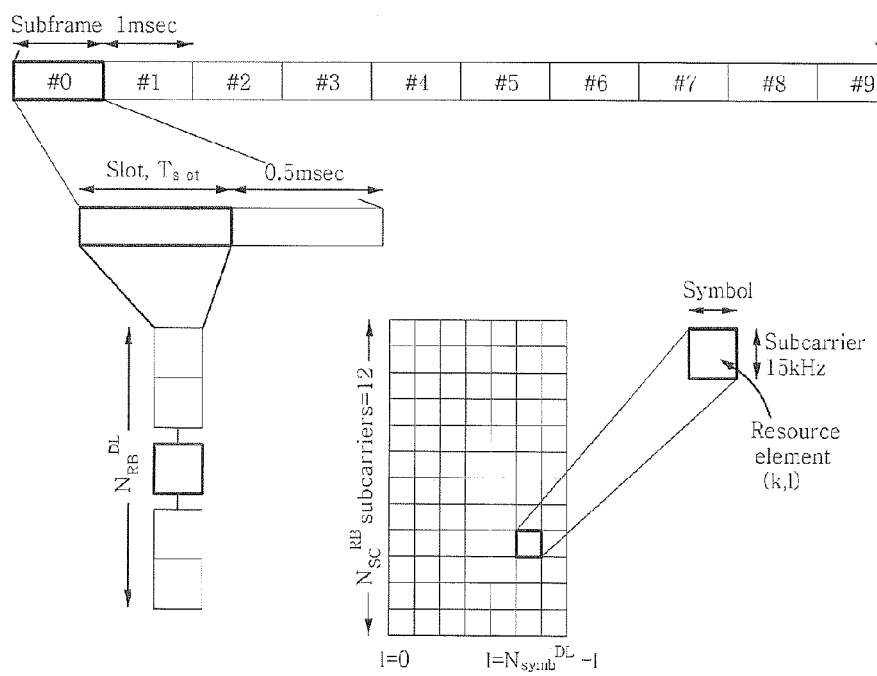
FIG. 4 is an illustration showing a subframe structure of an LTE signal.

FIG. 2 is a block diagram of an automatic detection apparatus for UL/DL configuration in LTE-TDD signal of the present invention; FIG. 3 is an illustration showing a frame structure of an LTE signal; and FIG. 4 is an illustration showing a subframe structure of an LTE signal.

As shown in FIG. 2, an automatic detection apparatus for UL/DL configuration in LTE-TDD signal comprises:

a signal receiving unit 100 for receiving an LTE-TDD RF signal and converting the LTE-TDD RF signal into a LTE-TDD baseband signal;

a signal extracting unit 110 for extracting a cell-specific reference signal for each subframe length in one frame length of the LTE-TDD baseband signal received from the signal receiving unit 100;

a signal power measurement unit 120 for measuring the power of the corresponding subframe reference signal according to the cell-specific reference signal received from the signal extracting unit 110; and an UL/DL configuration determination unit 130 for determining whether the corresponding subframe is a DL subframe or an UL subframe according to the comparison result of the power of the corresponding subframe reference signal measured in the signal power measurement unit 120 with a predetermined reference value, and determining the UL/DL configuration number for the corresponding frame based on the subframe number determined as described above. Such apparatus of the present invention described above can be implemented by a hardware configuration, a software configuration, or a mixed configuration of the both.

In the above-described configuration, the length of the signal transmitted from the signal receiving unit 100 to the signal extracting unit 110 is based on one frame of the LTE-TDD signal in accordance with the LTE Technical Specification as shown in FIG. 3; one frame has a length of 10 ms and comprised of a total of 10 subframes having 1 ms length per each subframe. Each subframe is divided into two slots as shown in FIG. 4, wherein each slot is comprised of multiple resource blocks (resource block will be referred to as 'RB' hereinafter), and each RB is comprised of a set of resource elements comprising a symbol and a sub-carrier.

As for reference signals, there are four major types of DL reference signal: a cell-specific reference signal related to the non-Multicast-Broadcast Single Frequency Network (referred to as 'non-MBSFN' hereinafter) transmission, a cell-specific reference signal related to Multicast-Broadcast Single Frequency Network (referred to as 'MBSFN' hereinafter) transmission, a user equipment specific reference signal, and a positioning specific reference signal. One reference signal is transmitted to every DL antenna port.

Meanwhile, the cell-specific reference signal can be transmitted at any DL subframe in a cell supporting non-MBSFN transmission. For a subframe for MBSFN transmission, only the first two OFDM symbols can be used for the cell-specific reference signal. The cell-specific reference signal is transmitted at more than one port among the antenna ports 0 to 3, and such cell-specific reference signal is defined only by sub-carrier spacing, $\Delta f = 7.5$ kHz.

A reference signal sequence $r_{l,n_s}(m)$ is defined by the Equation 1 below.

$$r_{l,n_s}(m) = \frac{1}{\sqrt{2}}(1 - 2 \cdot c(2m)) + j\frac{1}{\sqrt{2}}(1 - 2 \cdot c(2m+1)), \quad (1)$$

$$m = 0, 1, \ldots, 2N_{RB}^{max,DL} - 1$$

In the above Equation 1, $n_s$ stands for a slot number in the frame of the LTE-TDD signal, stands for an OFDM symbol number in such slot, and $c(i)$ stands for a pseudo random number sequence. A reference signal sequence $r_{l,n_s}(m)$ can be mapped to a complex-valued modulation symbol $a_{k,l}^{(p)}$ that that is used as a reference symbol for an antenna port p in the slot $n_s$ in accordance with the Equation 2 shown below. $N_{RB}^{max}$, DL stands for a maximum DL bandwidth configuration expressed in a multiple of $N_{sc}^{RB}$ that is the resource block (RB) size in the frequency domain expressed by number of sub-carriers.

$$c_{k,l}^{(p)} = r_{l,n_s}(m'), \quad (2)$$

$$k = 6m + (v + v_{shift}) \bmod 6$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

where $$m' = m + N_{RB}^{max,DL} - N_{RB}^{DL}$$

In the above Equation 2, $N_{RB}^{DL}$ stands for a DL bandwidth configuration expressed in a multiple of $N_{sc}^{RB}$, and $N_{symb}^{DL}$ stands for number of OFDM symbols in a DL slot. Variables v and $v_{shift}$ define positions in the frequency domain with respect to each different reference signal, and v is given as Equation 3 below.

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \mod 2) & \text{if } p = 2 \\ 3 + 3(n_s \mod 2) & \text{if } p = 3 \end{cases} \quad (3)$$

A cell-specific frequency shift $v_{shift}$ may be given as Equation 4 below, where $N_{ID}^{cell}$ stands for a physical layer cell identity.

$$v_{shift} = N_{ID}^{cell} \mod 6 \quad (4)$$

Meanwhile, resource element (k,l) used for reference signal transmission on any one of the antenna ports in a slot shall not be used for any transmission on any other antenna port in the same slot and shall be set to zero (refer to 3GPP TS 36.211 V9.0 (2008-12)).

As described above, the cell-specific reference signals exist in every base station and have unique values according to the number of the base station; a sub-carrier having the cell-specific reference signal can be identified by Equation 2.

Next, the signal power measurement unit 120 calculates the power of the $i^{th}$ subframe reference signal P(i) using Equation 5 shown below based on the cell-specific reference signal received from the signal extracting unit 110.

$$P(i) = \sum_{n=0}^{M_{RS}-1} (y(M_{RS} * i + n) * y(M_{RS} * i + n)) \quad (5)$$

In the above Equation 5, $M_{RS}$ stands for the length of the cell-specific reference signal included in every subframe, and y(n) stands for the power of the $n^{th}$ cell-specific reference signal among the cell-specific reference signals extracted by the signal extracting unit 110.

Next, as shown in Equation 6, the UL/DL configuration determination unit 130 determines whether the corresponding subframe is a DL subframe or not by comparing the power of the reference signal of the corresponding subframe that was measured in the signal power measurement unit 120 with the predetermined reference value, for example, the noise power (R) without any LTE-TDD signal; if the corresponding subframe is a DL subframe, the power of the signal is significantly higher than the noise power without LTE-TDD signal, so it can be determined whether the corresponding subframe is a DL subframe. On the other hand, if the corresponding subframe is an UL subframe, both the numerator and denominator become R making the ratio close to 1 since there is no cell-specific reference signal. The noise power can be preset through prior measurement or can be measured in realtime in the signal power measurement unit 120.

$$\text{if } P(i)/R \rangle 1 \text{ then the subframe is } DL, \text{ if } P(i)/R \leq 1 \text{ then the subframe is } UL \quad (6)$$

P(i)/R will be referred to as T(i) hereinafter.

Figure 5:
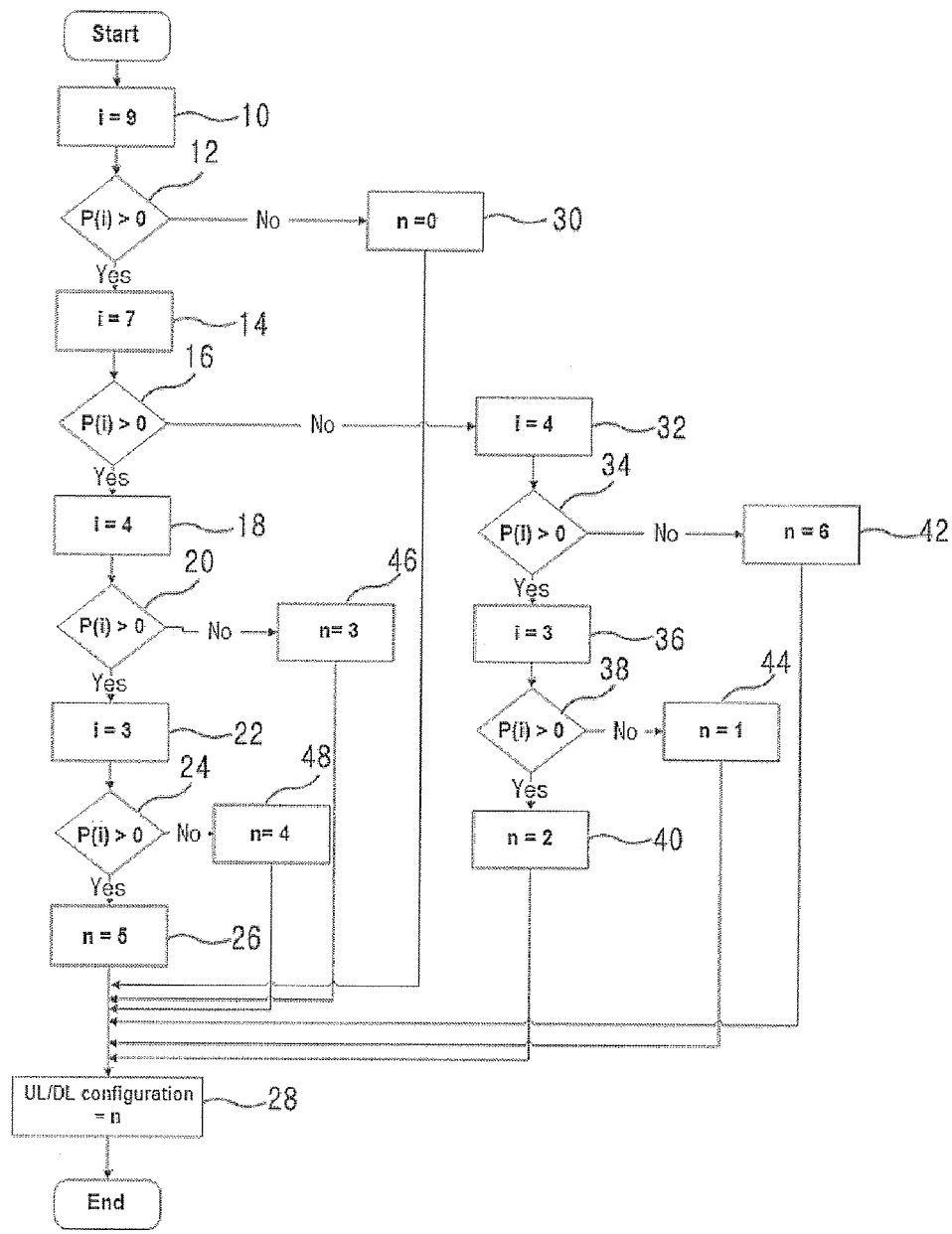
FIG. 5 is a flow diagram describing an automatic detection method for UL/DL configuration in LTE-TDD signal of the present invention.

FIG. 5 is a flow diagram describing an automatic detection method for UL/DL configuration in LTE-TDD signal of the present invention, and can be performed by the UL/DL configuration determination unit 130. As shown in FIG. 1, only DL subframes exist in subframes 0, 5, and 6, and only UL subframes exist in subframe 2, and only special subframes exist in subframe 1 for the subframe numbers 0, 1, 2, 5, and 6, therefore the UL/DL configuration number for the corresponding frame can not be determined by using these subframes. By considering this limitation, the computational load can be minimized in this present invention by determining the UL/DL configuration number for the corresponding frame by checking only the subframes 3, 4, 7 and 9 among the total 10 subframes, wherein the DL and UL subframes are mixed as shown in FIG. 5.

First, it is determined whether the T(i) of the subframe 9 is greater than 1; if it is less than 1, the corresponding subframe is an UL subframe, and the UL/DL configuration number for the corresponding frame is automatically determined as 0 because only the UL/DL configuration number 0 has an UL subframe for the subframe 9. Therefore, in the prospect of the signal analyzer, various relevant analysis can be performed after confirming that the subframes 0 and 5 are DL subframes while the subframes 2-4 and 7-9 are UL subframes.

In a similar manner, if the subframe 9 is a DL subframe, the subframe 7 is checked and if it is an UL subframe then the subframe 4 is checked; if the subframe 4 is an UL subframe then the UL/DL configuration number for the corresponding frame is automatically determined as 6; if the subframe 4 is a DL subframe then the subframe 3 is checked. At this state, if the subframe 3 is an UL subframe the corresponding UL/DL configuration number is automatically determined as 1, while the configuration number is determined as 2 if the subframe 3 is a DL subframe.

Meanwhile, if the subframe 7 is a DL subframe then the subframe 4 is checked; if the subframe 4 is an UL subframe then the corresponding UL/DL configuration number is automatically determined as 3; if the subframe 4 is a DL subframe then the subframe 3 is checked. At this state, if the subframe 3 is an UL subframe the corresponding UL/DL configuration number is automatically determined as 4, while the configuration number is determined as 5 if the subframe 3 is a DL subframe.

The present invention is not limited by the above described exemplary embodiments, and various changes and modification may be made to the above described embodiments, without departing from the scope and spirit of the present invention. For example, the apparatus of the present invention can be adopted as a part of the LTE signal analyzer, wherein the signal receiving unit 100 and the signal extracting unit 120 can be commonly utilized with other part of the signal analyzer.

The invention claimed is:

1. An automatic detection apparatus for UL/DL configuration in LTE-TDD signal comprising:
   a signal receiving unit for receiving an LTE-TDD RF signal and converting the LTE-TDD RF signal into a LTE-TDD baseband signal;
   a signal extracting unit for extracting a cell-specific reference signal for each subframe length in one frame length of the LTE-TDD baseband signal received from the signal receiving unit;
   a signal power measurement unit for measuring the power of the corresponding subframe reference signal according to the cell-specific reference signal received from the signal extracting unit; and
   an UL/DL configuration determination unit for determining whether the corresponding subframe is a DL subframe or an UL subframe according to the comparison result of the power of the corresponding subframe reference signal measured in the signal power measurement unit with a predetermined reference value, and determining a UL/DL configuration number for the corresponding frame by checking only the subframes 3, 4, 7 and 9 among the total 10 subframes wherein the DL and UL subframes are mixed.

2. The automatic detection apparatus for UL/DL configuration in LTE-TDD signal according to claim 1,
characterized in that the predetermined reference value is the noise power without any LTE-TDD signal.

3. An automatic detection method for UL/DL configuration in LTE-TDD signal comprising the steps of:
receiving an LTE-TDD RF signal, and thereafter converting into an LTE-TDD baseband signal;
extracting a cell-specific reference signal for each subframe length in one frame length of the LTE-TDD baseband signal;
measuring the power of the corresponding subframe reference signal according to the cell-specific reference signal; and
determining whether the corresponding subframe is a DL subframe or an UL subframe according to the comparison result of the power of the corresponding subframe reference signal measured in the signal power measurement unit with a predetermined reference value, and determining a UL/DL configuration number for the corresponding frame based on the subframe number determined as described above,
wherein the UL/DL configuration number for the corresponding frame is determined by checking only the subframes 3, 4, 7 and 9 among the total 10 subframes wherein the DL and UL subframes are mixed.

4. The automatic detection method for UL/DL configuration in LTE-TDD signal according to claim 3,
characterized in that the predetermined reference value is the noise power without any LTE-TDD signal.

* * * * *